(12) United States Patent
McGowan

(10) Patent No.: US 7,064,730 B2
(45) Date of Patent: Jun. 20, 2006

(54) VIEWING DEVICE WITH REPLAY FEATURE

(75) Inventor: Steven B. McGowan, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 112 days.

(21) Appl. No.: 09/981,230

(22) Filed: Oct. 17, 2001

(65) Prior Publication Data

US 2003/0071801 A1 Apr. 17, 2003

(51) Int. Cl.
*G09G 5/00* (2006.01)
*G09G 3/00* (2006.01)

(52) U.S. Cl. .................... 345/7; 345/32; 348/207.99

(58) Field of Classification Search ............... 345/7–9, 345/704, 723, 730, 545, 32; 348/79, 157, 348/207.1, 231.99, 231.2, 231.3, 296, 333.01–5, 348/333.05, 333.11, 207.99; 358/906, 909.1; 715/704, 723
See application file for complete search history.

(56) References Cited

U.S. PATENT DOCUMENTS

| | | | | |
|---|---|---|---|---|
| 3,833,758 A | * | 9/1974 | Ferrari | 386/117 |
| 4,496,981 A | * | 1/1985 | Ota | 348/294 |
| 4,571,628 A | * | 2/1986 | Thornton | 348/333.08 |
| 4,977,451 A | | 12/1990 | Besnard | 348/149 |
| 5,134,499 A | | 7/1992 | Sata et al. | 358/342 |
| 5,153,569 A | * | 10/1992 | Kawamura et al. | 345/8 |
| 5,164,751 A | | 11/1992 | Weyer | 396/430 |
| 5,282,092 A | | 1/1994 | Wilhelms | 360/5 |
| 5,479,302 A | | 12/1995 | Haines | 360/10.1 |
| 5,497,193 A | | 3/1996 | Mitsuhashi et al. | 348/231.99 |
| 5,953,487 A | * | 9/1999 | Engle et al. | 386/68 |
| 6,088,053 A | * | 7/2000 | Hammack et al. | 348/61 |
| 2002/0033960 A1 | | 3/2002 | Kazami | 358/1.14 |
| 2003/0007079 A1 | * | 1/2003 | Sisselman | 348/231.99 |

FOREIGN PATENT DOCUMENTS

| WO | WO 96/27864 | | 9/1996 |
|---|---|---|---|
| WO | WO 01/52531 | A1 | 7/2001 |

* cited by examiner

*Primary Examiner*—Alexander Eisen
(74) *Attorney, Agent, or Firm*—Trop, Pruner & Hu, P.C.

(57) ABSTRACT

A viewing device may be utilized to facilitate viewing of a scene or event. The viewing device may continuously record a sequence of frames of predetermined duration. At periodic intervals, the sequence of frames overwrite previously stored sequence of frames. When the user wishes to watch a replay of a previous sequence of frames of predetermined duration, the user can continue looking through the device to see a stored sequence of frames rather than a real time display of an ongoing event.

26 Claims, 5 Drawing Sheets

VIEWING DEVICE WITH REPLAY FEATURE

BACKGROUND

This invention relates generally to viewing devices, such as telescopes and binoculars.

Conventional viewing devices may facilitate the viewing of objects that are too far away from the viewer to be seen clearly. Such viewing devices may include cameras, binoculars, and telescopes. In many cases, cameras include optics which magnify the viewed image and therefore facilitate viewing of the image. In some cases, the camera may be used effectively as a telescope or binoculars.

Many times, viewers may be viewing scenes in which objects are changing positions rapidly. For example, viewers watching a sports event through a pair of binoculars, may miss details or a portion of what actually occurred. In one example, the action may occur so quickly that the user was unable to fully comprehend the event.

Thus, in a variety of situations, persons viewing scenes or objects may wish to re-view what they have just seen. Cameras may be utilized to record a scene. For example, some cameras include a movie option. In such case, the capacity of the camera to record scenes is limited. Therefore, when viewing an extended event, it may not be viable to simply record the whole event.

A movie camera may be utilized to record an entire event. However, a substantial amount of storage is needed to store the entire event if the event is sufficiently long. This results in complexities with respect to suitable storage media and with respect to the handling of those media. Moreover, the cost to achieve extended storage may be prohibitive in many applications.

Thus, conventional viewing devices may have limitations with respect to capturing fast moving events. Conversely, movie cameras may not be suitable in all situations to capture such events on an ongoing basis. Because of the awkwardness, weight and expense of suitable storage media for continuous storage, movie cameras may not always offer a reasonably convenient solution.

Therefore, there is a need for better ways to enable users to view events that may include complex motion, actions or occurrences.

DETAILED DESCRIPTION

Figure 1:
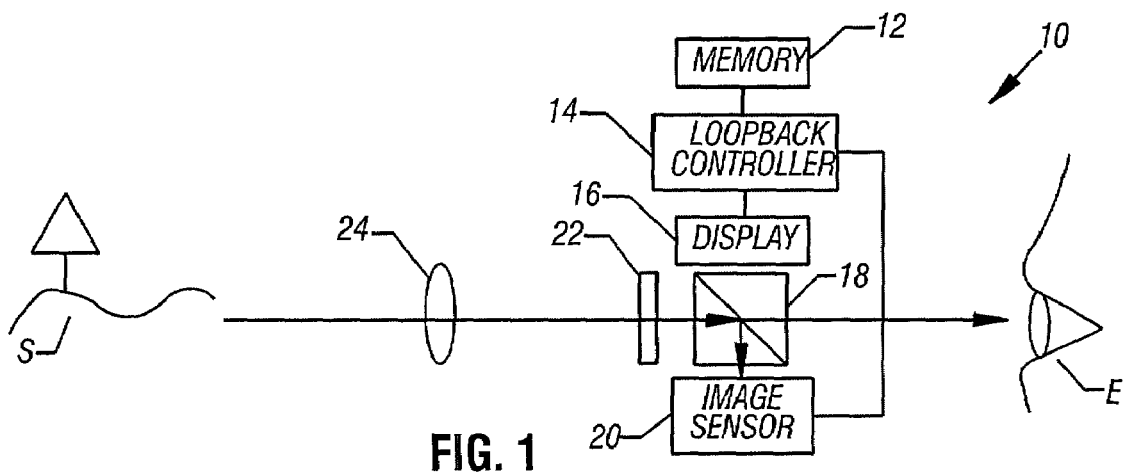
FIG. 1 is a block depiction of one embodiment of the present invention.

Referring to FIG. 1, a replay viewing device 10 may include an optical element 24 to capture a scene S. The optical element 24 may be a focusing lens, a telescopic lens, a macrolens, or any of a variety of other optical systems. The optical path between the scene S and the user's eye E may be selectively blocked by a shutter 22. Also in the optical path is a beam splitter 18 in one embodiment.

With the shutter 22 open, light from the scene S passes through the optical element 24 and the shutter 22. Part of the light is reflected by the beam splitter 18 to be captured by the image sensor 20. In one embodiment, the image sensor 20 may be a complementary metal oxide semiconductor (CMOS) image sensor. Alternatively, the image sensor 20 may be a charge coupled device (CCD) image sensor. The remaining portion of the light from the scene S passes onwardly for viewing by the user indicated at E.

The replay viewing device 10 may be binoculars, a telescope, a microscope, or even a camera. It may function in one or more of these modes in different embodiments.

The image sensor 20 may be coupled to a loopback controller 14. In one embodiment, the loopback controller 14 may be a microcontroller. The loopback controller 14 controls when the image sensor 20 captures images and when the image sensor 20 transfers captured frames to the loopback controller 14 for storage in the memory 12 or for display on the display 16.

In one embodiment, the display 16 may be a liquid crystal display; however, any other display technology may be utilized as well. When an image is displayed on the display 16, it is reflected by the beam splitter 18 for viewing by the user indicated at E.

The memory 12 may be any convenient storage device including a flash memory. In some embodiments, the device 10 may be portable and may be battery powered.

In one mode of operation, the image sensor 20 continuously records the scene indicated at S as long as the shutter 22 is open. The image sensor 20 may record a sequence of frames that are transferred by the loopback controller 14 to memory. The loopback controller 14 may take a predetermined sequence of frames of defined duration and may store that sequence in the memory 12. Upon user selection of the re-view feature, that sequence of frames may be displayed on the display 16.

In one embodiment, the memory 12 may be only of a sufficient capacity to handle a single sequence of frames of the predetermined duration. Thereafter, the loopback controller 14 automatically overwrites the existing memory 12 with frames newly captured.

In some embodiments, the memory 12 may be capable of storing a predetermined number of such sequences of frames. However, once the memory 12 is full, the ensuing or subsequent storage of a sequence of frames overwrites an earlier stored sequence of frames.

Figure 2:
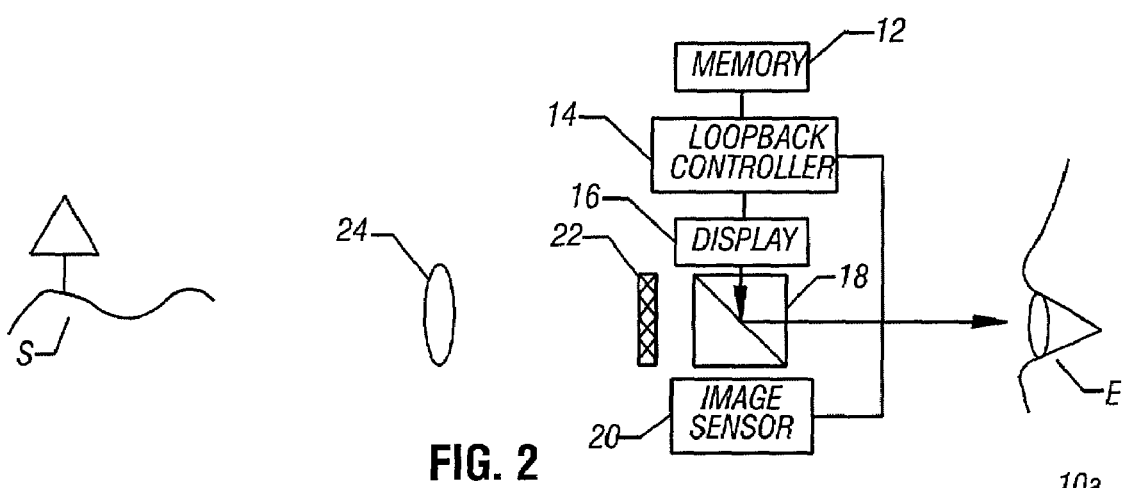
FIG. 2 is a block depiction of the embodiment shown in FIG. 1 in a different mode in accordance with one embodiment of the present invention.

Thus, the viewing device 10 continuously records sequences of frames and makes them available for viewing until such time as they need be overwritten. The user can select the option to display a previously stored sequence of frames. In such case, the loopback controller 14 accesses a sequence of frames from memory 12 and displays them on the display 16. As a result, the user has access to a replay feature. If the user wants to watch a given sequence of events that fit within the defined duration again, the user can select the replay option and simply view, through the display 16, the stored sequence in place of the real time scene S. In such case, as shown in FIG. 2, the shutter 22 may be closed so that the user does not view both the ongoing activities in the scene S and the replayed, stored sequence of frames.

In some embodiments, the storage of frame sequences may be stopped based on the attitude of the device 10. For example, if the device 10 is simply pointing downwardly, the storage of frame sequences may be automatically terminated. In such embodiment, an angular orientation sensor may be used to detect device 10 attitude to save power and preserve meaningful data.

In other embodiments, the user may operate a button to select the display of stored frame sequences. In response to operation of the button, the shutter 22 is automatically closed and the replay of the stored frame sequence is automatically initiated.

The loopback controller 14 and memory 12 may work in a circular queue, in one embodiment, to allow the video recording memory to be continuously reused until the user stops the loop. In addition, other buffers and memory systems amenable to a looping system may be used, as well. In some embodiments, the predetermined number of frames may be set initially. In other embodiments, the user may specify the length or duration of the sequence of frames up to the maximum capacity of the memory 12. Thus, in some embodiments, one or more loops may be utilized that are of a user configurable duration. The capacity of the memory 12 may be substantially sufficient to store an integral number of loop lengths, such as one, two or three loop lengths.

Figure 3:
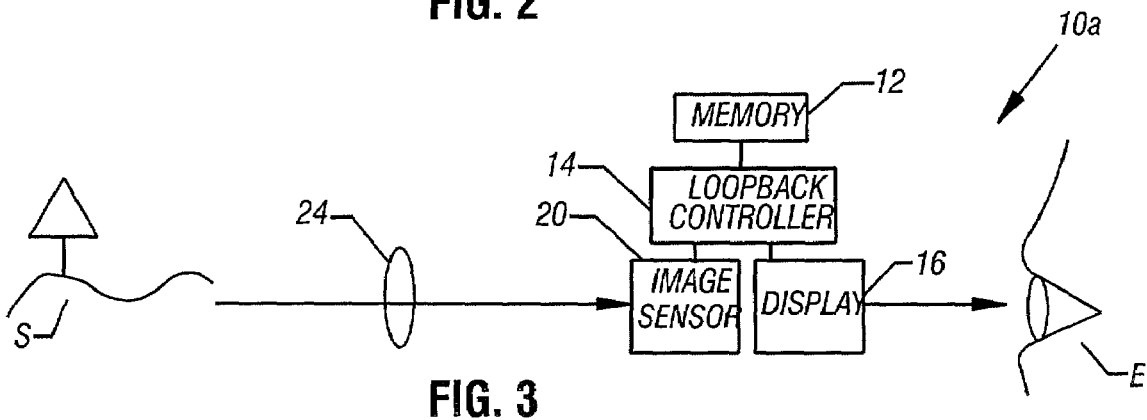
FIG. 3 is a block depiction of another embodiment of the present invention.

Referring to FIG. 3, in accordance with another embodiment of the present invention, a viewing device 10a may include an image sensor 20 that receives light from a scene S through an optical element 24. The image sensor 20 may capture a number of frames and transfer them to the loopback controller 14 that stores them on the memory 12. These frames may be simultaneously displayed on the display 16 and transferred to memory by the loopback controller 14 as soon as they are captured. Thus, the user, indicated at E, receives a real time display of the captured frames that may be so slightly displaced in time that the user may not even notice the time sequencing in one embodiment.

The loopback controller 14 can develop a real time display of the current image or may selectively display a sequence of frames stored in the memory 12. Thus, when the user selects the replay option, the real time display stops and a sequence of frames is displayed on the display 16 under control of the loopback controller 14.

Figure 4:
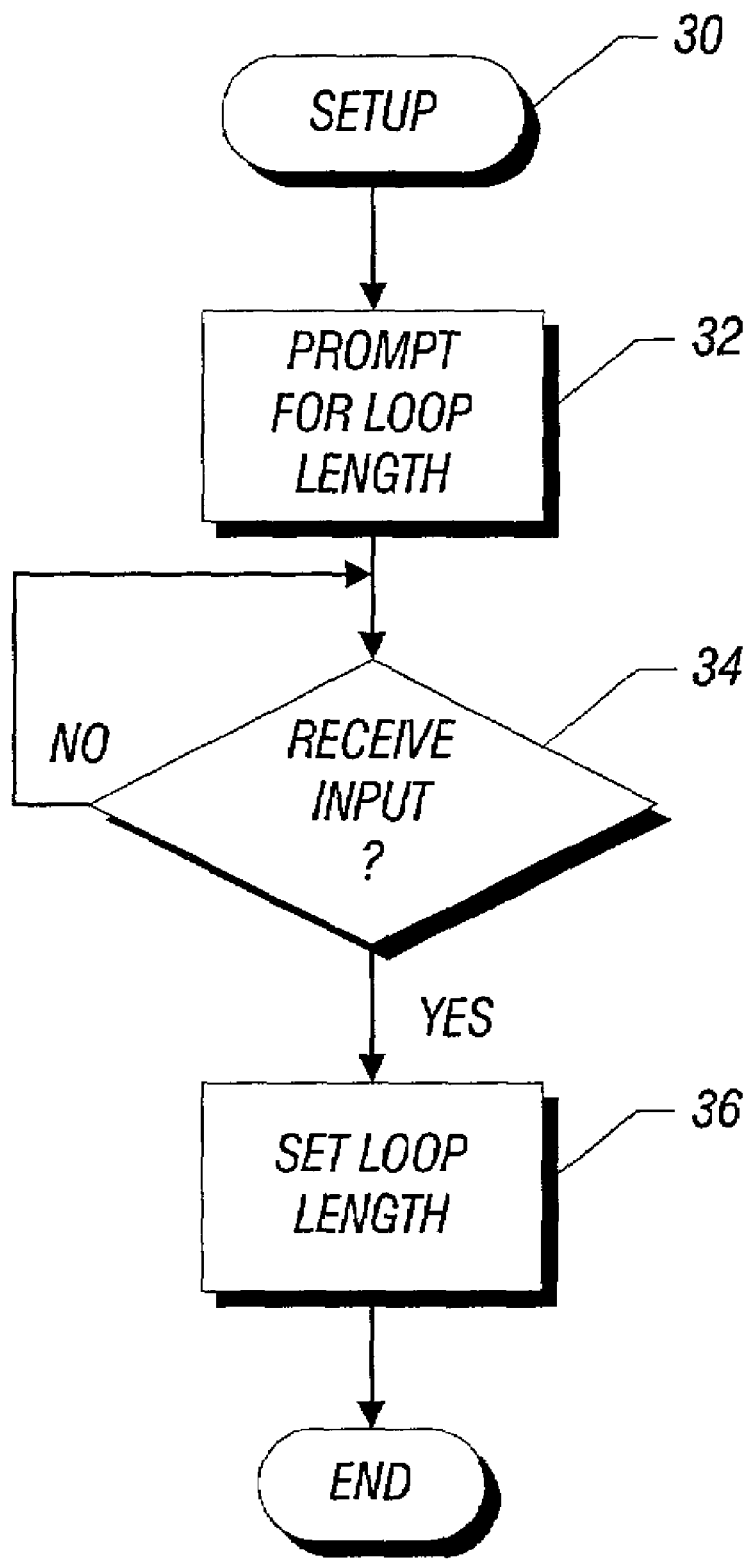
FIG. 4 is a flow chart for setup software in accordance with one embodiment of the present invention.

Referring to FIG. 4, the setup software 30 may be stored in the memory 12, in one embodiment of the present invention. Initially, the setup software 30 sets a default loop length. When the user enters set-up mode, the software 30 prompts the user to enter a loop length, as shown at block 32, for example, by enabling the display and displaying some form of menu selections. The loop length is the duration of the predetermined sequence of frames. Thus, the user may provide an input that is detected at diamond 34. Once the input is received, the loop length is set as indicated in block 36.

Figure 5:
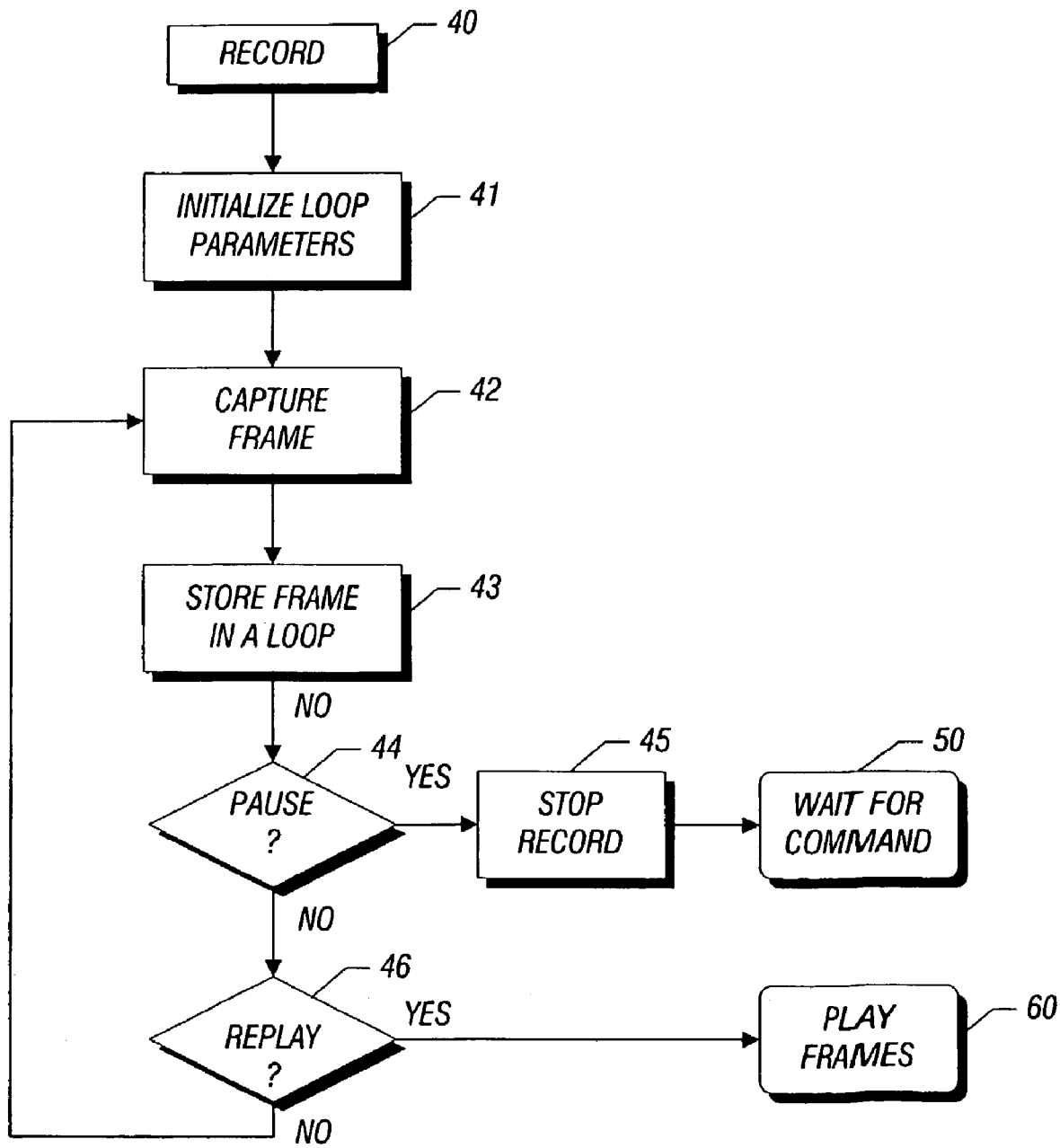
FIG. 5 is a flow chart for record software in accordance with one embodiment of the present invention.

Turning to FIG. 5, the recording of the sequence of frames may be controlled by software 40, that may also be stored on the memory 12, in one embodiment. Of course, separate removable memories may be provided in some embodiments.

The device 10 may support some fixed number of loops in some embodiments. The number of loops depends on the available memory and the loop length set by the user. Different types of events may involve different loop times. In each case, the loop count is set to the average length of the respective event. Each loop may store four parameters: first frame offset, last frame offset, loop buffer size, and whether the loop has been used.

Upon entering the record software 40, the loop parameters are initialized as indicated at block 41 in FIG. 5. Individual frames are captured (block 42) and stored in a loop (circular queue) in memory, as indicated at block 43. Between the storage of each frame, a check determines whether any user inputs have been received. If the pause button is pressed, as determined in diamond 44, the record loop is stopped (block 45) and the software 40 waits for a command from the user that indicates what to do next (block 50). If the replay button is operated as determined in diamond 46, the play frames software 60 is executed.

Figure 6:
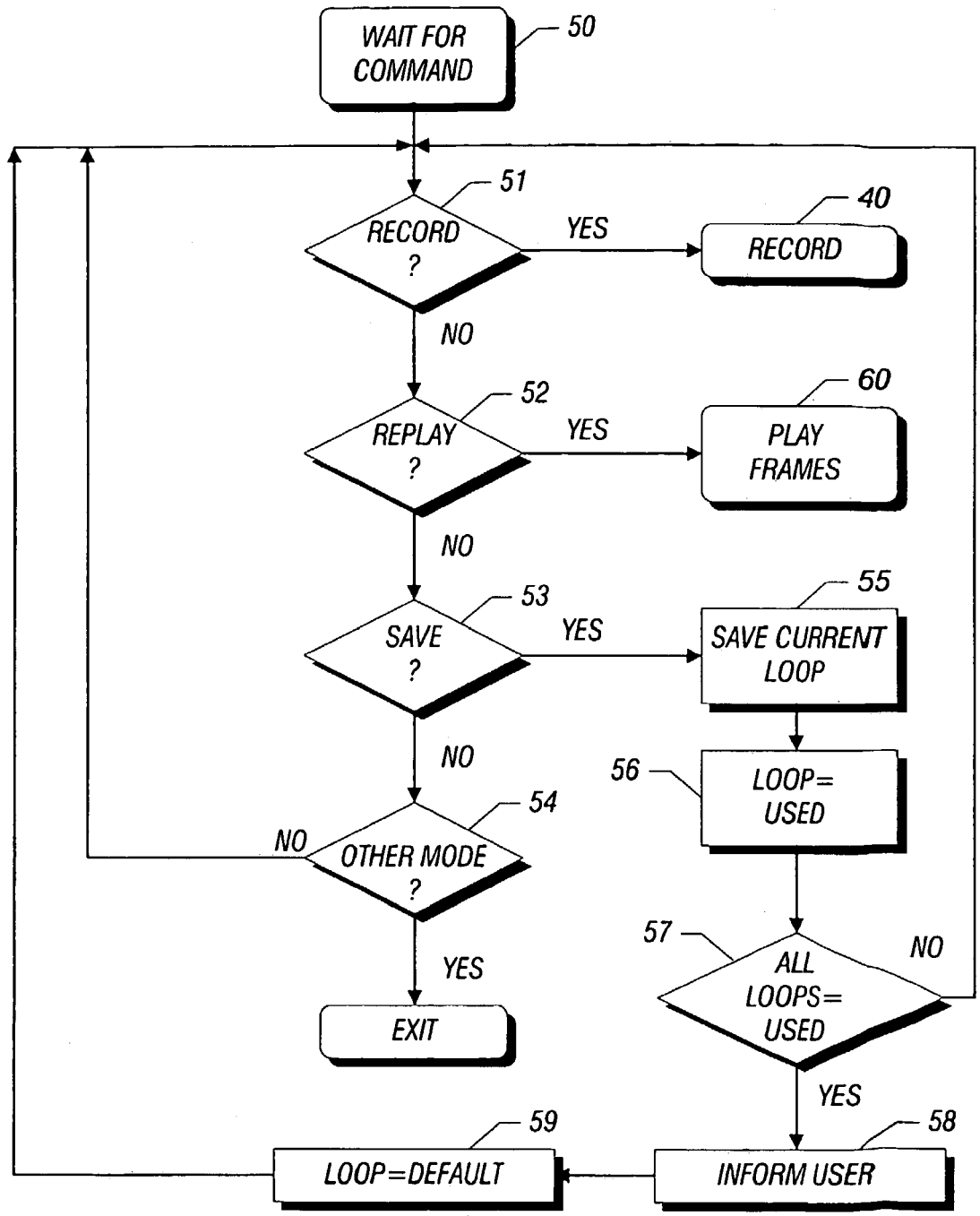
FIG. 6 is a flow chart for command software in accordance with one embodiment of the present invention.

A basic command loop 50 that waits for user input is shown in FIG. 6. Pressing the record button (diamond 51) returns to the record software 40 immediately, reinitializes the software 40 and overwrites the previously stored frames with new frames. Operation of the replay button, as detected at diamond 52, causes the current loop to be replayed. Every time the replay button is pressed, the playback begins at the "beginning" of the loop, i.e., the oldest frame in the loop. If the save button is pressed (diamond 53), then the current loop parameters are saved (block 55) and the loop is marked as used (block 56). If the next available loop is not used (diamond 57) then its parameters become the current loop parameters and the flow goes back to waiting for the next command.

If all loops are marked as used (diamond 57) then the user will be informed (block 58) that the current loop is now set to the default loop (block 59). There is a default loop that allows the replay feature to continue to work when all the loops are used. The data in the default loop can be saved later when the device 10 is attached to a computer system (not shown) and the rest of the loops are saved.

Figure 7:
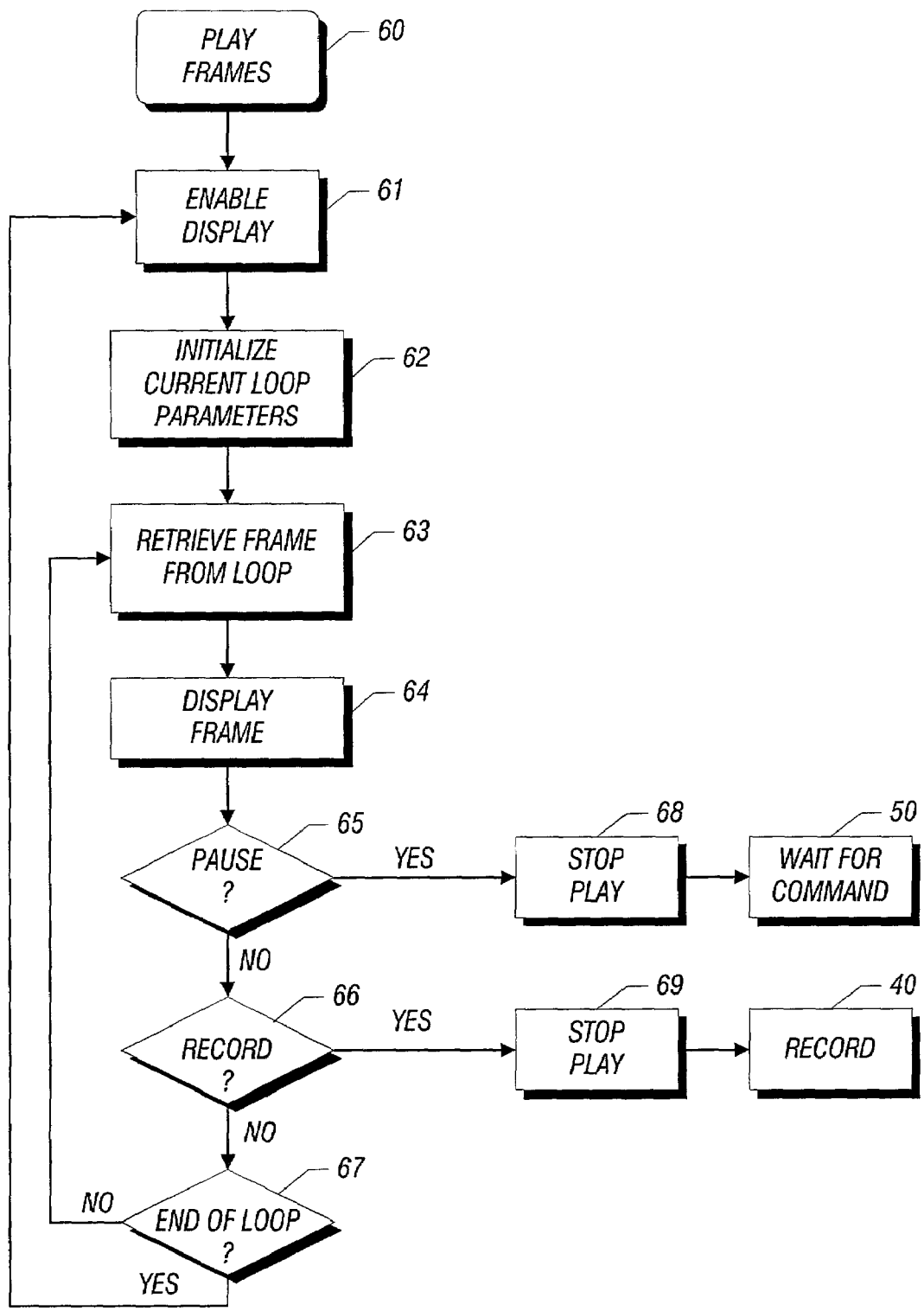
FIG. 7 is a flow chart for replay software in accordance with one embodiment of the present invention.

When the user presses the play frames button (block 60), the display is enabled (block 61) and the parameters for the loops are initialized (diamond 62) as shown in FIG. 7. Playback begins with the oldest frame in the loop. A frame is retrieved (block 63) and the frame is displayed (block 64). Between the display of each frame, a check determines whether any user inputs have been received. If the pause button is pressed (diamond 65) the play is stopped (block 68) and the software 60 waits for a user command indicating what to do next (block 50). If the record button is pressed (diamond 66) the play is stopped (block 69) and the record software 40 is executed. If the end of the loop is reached (diamond 67) then the flow is restarted at block 61.

While the present invention has been described with respect to a limited number of embodiments, those skilled in the art will appreciate numerous modifications and variations therefrom. It is intended that the appended claims cover all such modifications and variations as fall within the true spirit and scope of this present invention.

The invention claimed is:
1. A device comprising:
an image sensor to capture frames;
a storage to store one sequence of frames of predetermined duration as a first loop and another, separately accessible sequence of frames of predetermined duration as a second loop, the length of the first and second loops set prior to storage of a first sequence of frames, said storage coupled to said sensor;
a display coupled to said storage to display the sequence of frames; and
a controller to store successive sequences of frames of the predetermined duration as a first loop, said controller to save the sequence of frames currently stored as said first loop and store the next successive sequence of frames as a second loop in response to a user input other than a replay input, and said controller to selec- tively play back either said first loop or said second loop in response to another user input.

2. The device of claim 1 wherein said controller, at the end of the one sequence, loops back to the beginning of the one sequence and overwrites the one sequence of frames with ensuing sequence of frames.

3. The device of claim 1 wherein said storage has the capacity to store an integral number of sequences of frames of predetermined duration as a plurality of loops, the length of the loops optionally set by a user prior to storage of a first sequence of frames.

4. The device of claim 1 wherein said device is a camera.

5. The device of claim 1 wherein said device is a telescope.

6. The device of claim 1 wherein said device is a microscope.

7. The device of claim 1 wherein said device is binoculars.

8. The device of claim 1 including an optics element that includes a beam splitter, said beam splitter arranged to pass light from said scene or to pass light from said display for viewing by the user.

9. The device of claim 8 including a shutter to control viewing access to said optics element.

10. The device of claim 1 wherein said device selectively enables the user to view said display or a scene through said optics element.

11. The device of claim 1 including an optics element which is in light communication with said image sensor and the only way to view a scene through said optics element is by way of said display.

12. The device of claim 1 wherein said controller enables the user to select when to display a sequence of frames of predetermined duration.

13. A method comprising:
    recording a sequence of frames of predetermined duration as a first loop or a second loop;
    overwriting said sequence of frames with an ensuing sequence of frames of substantially the same duration; and
    in response to a user selection other than a replay selection, marking the loop in which a sequence of frames is currently being recorded as used to save the current sequence of frames from being overwritten and advancing to an unused loop to enable recording of successive sequences of frames, the user being enabled to selectively view either said first loop or said second loop.

14. The method of claim 13 including, at the end of said first sequence, looping back to the beginning of the first sequence and overwriting said first sequence with a third sequence of frames.

15. The method of claim 13 including storing a integral number of sequences of frames of predetermined duration as separately accessible loops.

16. The method of claim 13 including enabling the user to selectively view a scene or a recorded sequence of frames of predetermined duration.

17. The method of claim 13 including displaying a real time image on a display and selectively enabling the user to replace the real time display with the display of a stored sequence of frames.

18. An article comprising a medium storing instructions that, if executed, enable a processor-based system to:
    record a sequence of frames of a predetermined duration as a first loop or a second loop;
    overwrite said recorded sequence of frames with an ensuing sequence of frames of substantially the same duration; and
    in response to a user selection other than a replay selection, mark the loop in which a sequence of frames is currently being recorded as used to save the current sequence of frames from being overwritten and advancing to an unused loop to enable recording of successive sequences of frames, the user being able to view either the first loop or the second loop.

19. The article of claim 18 further storing instructions that enable the processor-based system to, at the end of said first sequence, loop back to the beginning of the first sequence and overwrite said first sequence with a third sequence of frames.

20. The article of claim 18 further storing instructions that enable the processor-based system to store an integral number of sequences of frames of predetermined duration as separately accessible loops.

21. The article of claim 18 further storing instructions that enable the processor-based system to enable the user to selectively view a scene or a recorded sequence of frames of predetermined duration.

22. The article of claim 18 further storing instructions that enable the processor-based system to display a real time image on a display or selectively enable the user to replace the real time display with the display of a stored sequence of frames.

23. A method comprising:
    recording a sequence of frames of predetermined duration as a first loop or a second loop;
    overwriting said sequence of frames with an ensuing sequence of frames of substantially the same duration while displaying the images captured on said ensuing sequence of frames; and
    in response to user selection, enabling the user to selectively view either said first loop or said second loop.

24. The method of claim 23 further including storing an integral number of sequences of frames of predetermined duration as a corresponding number of loops, the length of the loops optionally preset by a user prior to storage of a first sequence of frames.

25. The method of claim 23 further including sensing the orientation of a recording device and automatically stopping said recording based on the orientation of said device.

26. The method of claim 23 further including marking said first loop or said second loop as used to prevent the marked loop from being overwritten.

* * * * *